United States Patent
Ugolini

(10) Patent No.: US 9,648,896 B2
(45) Date of Patent: May 16, 2017

(54) MACHINE WITH ENGAGEABLE TANK FOR ICE CREAMS, GRANITA OR ICED BEVERAGES

(75) Inventor: Marco Corrado Ugolini, Milan (IT)

(73) Assignee: UGOLINI SPA, Milan (IT)

(*) Notice: Subject to any disclaimer, the term of this patent is extended or adjusted under 35 U.S.C. 154(b) by 859 days.

(21) Appl. No.: 13/993,431

(22) PCT Filed: Aug. 31, 2011

(86) PCT No.: PCT/IB2011/053804
§ 371 (c)(1),
(2), (4) Date: Jun. 12, 2013

(87) PCT Pub. No.: WO2012/085692
PCT Pub. Date: Jun. 28, 2012

(65) Prior Publication Data
US 2013/0263747 A1      Oct. 10, 2013

(30) Foreign Application Priority Data
Dec. 22, 2010   (IT) .............................. MI2010A2357

(51) Int. Cl.
A23C 3/04         (2006.01)
A01J 11/00        (2006.01)
(Continued)

(52) U.S. Cl.
CPC .............. A23G 9/22 (2013.01); A23G 9/045 (2013.01); B67D 1/00 (2013.01); A01J 25/008 (2013.01);
(Continued)

(58) Field of Classification Search
CPC ..... F25D 23/062; F25D 31/002; A45C 11/20; A23G 9/227; A23G 9/045; A23G 9/228;
(Continued)

(56) References Cited

U.S. PATENT DOCUMENTS 2,541,814 A * 2/1951 Gaddini ................. A23G 9/106
                                                      366/213
4,900,158 A * 2/1990 Ugolini ................... B01F 7/088
                                                      366/143
(Continued)

FOREIGN PATENT DOCUMENTS

| EP | 0876765 A2   | 11/1998 |
| JP | 2001169730 A | 6/2001  |
| JP | 2010148591 A | 7/2010  |

OTHER PUBLICATIONS

PCT International Search Report and Written Opinion dated Feb. 1, 2012 for PCT/IB3022/053804 from which the instant application is based, 7 pgs.

(Continued)

Primary Examiner — Quang D Thanh
Assistant Examiner — Hemant Mathew
(74) Attorney, Agent, or Firm — Fredrikson & Byron, P.A.

(57) ABSTRACT

A machine for producing and dispensing products such as ice cream, iced beverages or granita comprises a removable product-containing tank which is provided at its front end with a tap for dispensing the product and which, via its rear opening, sealingly houses a cooling element with a substantially horizontal axis and a motor-driven mixer element. The tank is removable from the machine by means of extraction from its operating position in a disassembly direction which is substantially parallel to the axis of the cooling element, and snap-engaging means for locking the movement of the tank are provided between the tank and its seat on the base of the machine, said means being able to be manually released by means of operation of at least one operating lever.

10 Claims, 3 Drawing Sheets

(51) Int. Cl.
| | |
|---|---|
| A23C 1/00 | (2006.01) |
| A23C 3/02 | (2006.01) |
| G01F 11/00 | (2006.01) |
| F25D 19/00 | (2006.01) |
| F25D 3/00 | (2006.01) |
| A23G 9/22 | (2006.01) |
| A23G 9/04 | (2006.01) |
| B67D 1/00 | (2006.01) |
| F24F 13/20 | (2006.01) |
| A47K 5/12 | (2006.01) |
| F25D 31/00 | (2006.01) |
| A23L 3/22 | (2006.01) |
| A01J 25/00 | (2006.01) |
| A47J 31/44 | (2006.01) |

(52) U.S. Cl.
CPC .............. *A23L 3/22* (2013.01); *A47J 31/4485* (2013.01); *A47K 5/1202* (2013.01); *F24F 13/20* (2013.01); *F25D 31/002* (2013.01)

(58) Field of Classification Search
CPC ... A23G 9/12; B65D 7/24; B65D 7/12; B65D 25/24; B65D 25/22; A01J 25/008; A47J 31/4485; A23L 3/22; F25B 25/005; B67D 1/06; B67D 1/0889–1/0892; B01F 15/00772; B01F 15/00824; B01F 15/00831; F25C 5/00; F25C 5/02; F25C 5/007; F25C 5/14; F25C 5/16; F25C 5/18; F25C 5/182
USPC .... 99/455, 275, 452, 453; 62/136, 188, 342, 62/333, 394, 68, 298, 344–346; 220/592.02, 592.03, 592.04, 682, 691; 222/165, 325
See application file for complete search history.

(56) References Cited

U.S. PATENT DOCUMENTS

| | | | | |
|---|---|---|---|---|
| 5,713,214 | A * | 2/1998 | Ugolini | A23G 9/166 137/392 |
| 5,906,105 | A * | 5/1999 | Ugolini | A23G 9/045 366/274 |
| 6,026,988 | A * | 2/2000 | Teetsel, III | B67B 7/26 222/108 |
| 6,058,721 | A * | 5/2000 | Midden | A23G 9/045 62/136 |
| 6,163,095 | A * | 12/2000 | Shams | A23G 9/045 310/104 |
| 6,349,852 | B1 * | 2/2002 | Ford | B67D 1/0042 222/129.1 |
| 6,619,056 | B2 * | 9/2003 | Midden | A23G 9/045 62/136 |
| 6,619,511 | B2 * | 9/2003 | Hydak | B67D 3/0038 141/18 |
| 6,845,703 | B2 * | 1/2005 | Ugolini | E05C 1/12 62/340 |
| 2003/0075520 | A1 * | 4/2003 | Ugolini | E05C 1/12 215/302 |

OTHER PUBLICATIONS

Italian Search Report and Written Opinion dated Jul. 11, 2011 for related IT application MI20102357, 7 pgs.

* cited by examiner

US 9,648,896 B2

MACHINE WITH ENGAGEABLE TANK FOR ICE CREAMS, GRANITA OR ICED BEVERAGES

RELATED APPLICATIONS

This application is a 35 U.S.C. 371 national stage filing from International Application No. PCT/IB2011/053804 filed Aug. 31, 2011 and claims priority to Italian Application No. MI2010A0002357 filed Dec. 22, 2010, the teachings of which are incorporated herein by reference.

FIELD OF THE INVENTION

The present invention relates to a machine for producing and dispensing products such as ice creams, granita or iced beverages, of the type comprising a tank for the product, which contains a cooling evaporation cylinder around which a motor-driven mixer element rotates coaxially.

BRIEF SUMMARY OF EMBODIMENTS OF THE INVENTION

The tank has a front tap and a large rear opening which sealingly engages against an end wall of the machine from which the evaporator and the rotating shaft of the mixer element project.

The correct position of the tank is usually ensured by the friction between the hydraulic seal, present on the end wall, and the mouth of the rear opening in the tank. The mixer element, however, produces an axial thrust on the product towards the front of the tank which may exceed the force with which the seal retains the tank. This may cause a movement of the tank, resulting in leakage of the hydraulic seal, or also a sudden separation of the tank. In the art it has been attempted to overcome this drawback by modifying the form of the seal, for example by designing it so as to have a cross-section consisting of triangular steps directed opposite to the direction of extraction of the tank, so as to increase the force with which the corresponding edge of the tank is retained.

In the case of particularly dense products to be dispensed, such as ice cream, the force with which the tank must be retained is such that the force which the user must apply in order to insert or remove the tank during normal maintenance and cleaning of the machine is necessarily also very high.

Attempts have also been made to make use of interfering parts projecting from the tank and/or from its seat, with flexing of the elastic structure in order to release it, or screw-type locking systems. These systems, however, generally are difficult to operate and/or are not sufficiently strong.

The general object of the present invention is to provide a machine of the abovementioned type, which has a reliable system for retaining and removing the tank. In particular, it is desirable to have a low-cost, easy-to-operate and quick system, which reliably retains the tank during use of the machine, but which allows easy disengagement when required.

In view of this object, the idea which has occurred according to the invention is to provide a machine for producing and dispensing products such as ice cream, iced beverages or granita, comprising a removable product-containing tank which is provided at its front end with a tap for dispensing the product and which, via its rear opening, sealingly houses a cooling element with a substantially horizontal axis and a motor-driven mixer element which rotates coaxially with the cooling element so as to keep the product stirred and push it towards the dispensing tap, the tank being removable from the machine by means of extraction from its operating position in a disassembly direction which is substantially parallel to the axis of the cooling element, characterized in that the tank has a bottom surface which faces a corresponding seat on the base of the machine and in that snap-engaging means for locking the movement of the tank in the said disassembly direction are provided between said seat and the tank, said means being able to be manually released by means of operation of at least one operating lever.

BRIEF DESCRIPTIONS OF DRAWINGS

In order to illustrate more clearly the innovative principles of the present invention and its advantages compared to the prior art, an example of embodiment applying these principles will be described below, with the aid of the accompanying drawings. In the drawings.

DETAILED DESCRIPTION OF EMBODIMENTS OF THE INVENTION

Figure 1:
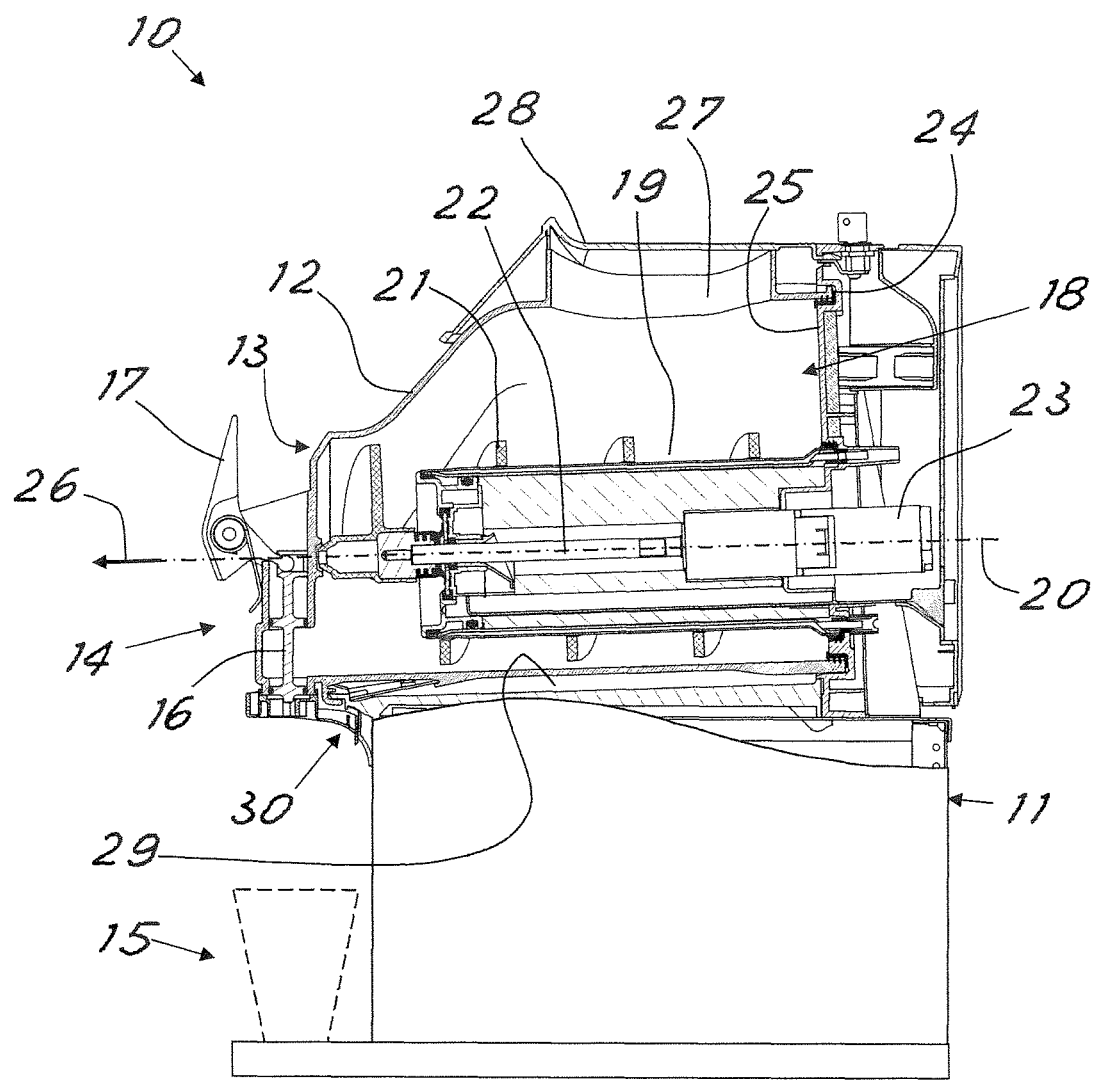
FIG. 1 shows a partially cross-sectioned, schematic, side elevation view of a machine according to the invention.

With reference to the figures, FIG. 1 shows a machine, denoted generally by 10, for producing and dispensing products such as ice cream, iced beverages or granita.

The machine 10 comprises a base 11 which contains known refrigerating and electric circuits (not shown) for conventional operation of the machine. A disengageable tank 12 is mounted on top of the base and is intended to contain the product, being provided at its front end 13 with a tap 14 for dispensing the product in an underlying zone 15 for receiving a special receptacle (such as a cone or a cup shown in broken lines in the figure). Advantageously, the tap 15 comprises a plunger 16 operated so as to open by means of a lever 17.

The tank 12 has a rear opening 18 through which a cylindrical cooling element 19 with a substantially horizontal axis 20 is sealingly housed inside the tank. The cooling element 19 forms part of the refrigerating circuit of the machine for suitably cooling the product which is placed inside the tank.

A motor-driven mixer element 21 rotates coaxially with the cylinder 19 so as to keep the product stirred and push it towards the dispensing tap.

Advantageously, the mixer element 21 is designed in the form of a cylindrical spiral screw which rotates about the cooling element and which, at the front end of the cooling element, is engaged on the end of a motor-driven shaft 22 which passes axially through the cooling element. The shaft 22 is rotated by a suitable electric motor 23.

Advantageously, the rear opening 18 of the tank is sealingly closed around the base of the cylindrical cooling element by means of an annular seal 24 present in a vertical wall 25 of the machine from which the cooling element and the mixer element project.

The tank is removable from its operating position (shown in FIG. 1) by means of extraction from the machine in a disassembly direction (indicated generally by 26 in FIG. 1) which is substantially parallel to the axis of the cooling element, so that the edge of the rear opening 18 is extracted from the seal on the rear vertical wall.

The tank is also provided with a top opening 27 for topping up the product. This top opening is advantageously closed by a lid 28 which may be provided with a key.

Figure 2:
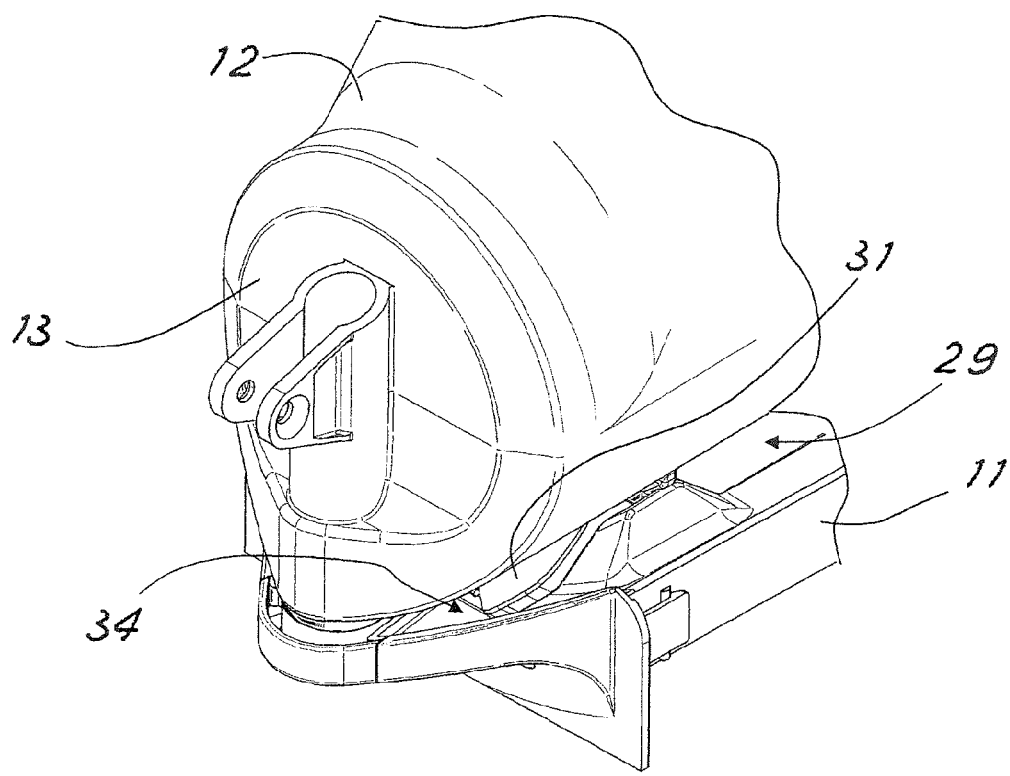
FIG. 2 shows a partial, schematic, enlarged perspective view of a front part of the machine according to FIG. 1, with parts removed for greater clarity.

The tank has a bottom surface which faces a receiving seat 29 formed on the base of the machine. Snap-engaging means 30 for locking the movement of the tank in the disassembly direction are provided between said seat and the tank. These engaging means can be manually released by means of operation of at least one operating lever 31, as can be seen more clearly in FIG. 2.

Figure 3:
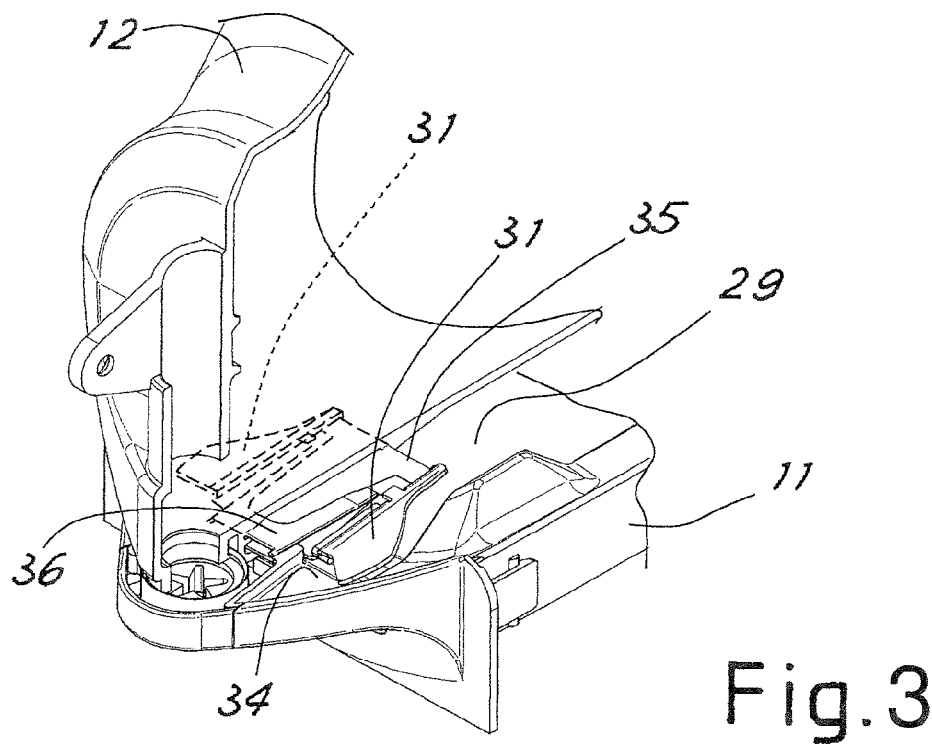
FIG. 3 shows a schematic view, similar to that of FIG. 2, but with the tank partially cross-sectioned.

Advantageously, as schematically shown in FIG. 3, the operating levers 31 are two in number and are designed in the form of tabs projecting symmetrically on the two sides of the tank in the vicinity of its front end.

Figure 4:
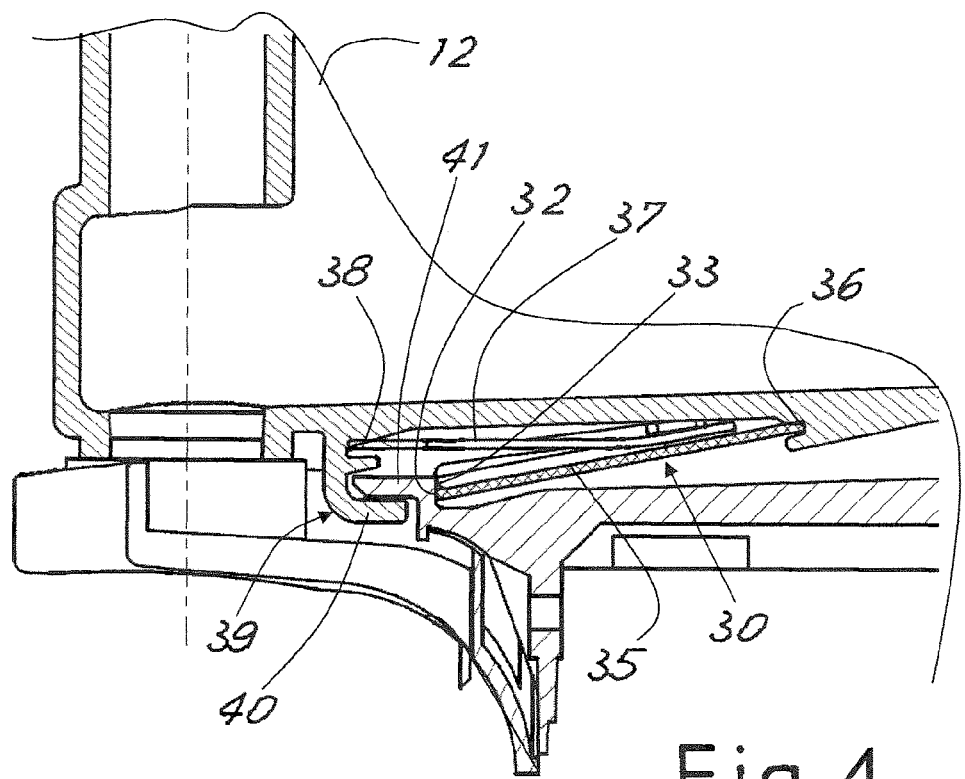
FIGS. 4 and 5 shows schematic cross-sectional views of a zone of the machine comprising a mechanism for snap-engagement of the tank, in the engaged position and disengaged position, respectively.
Figure 5:
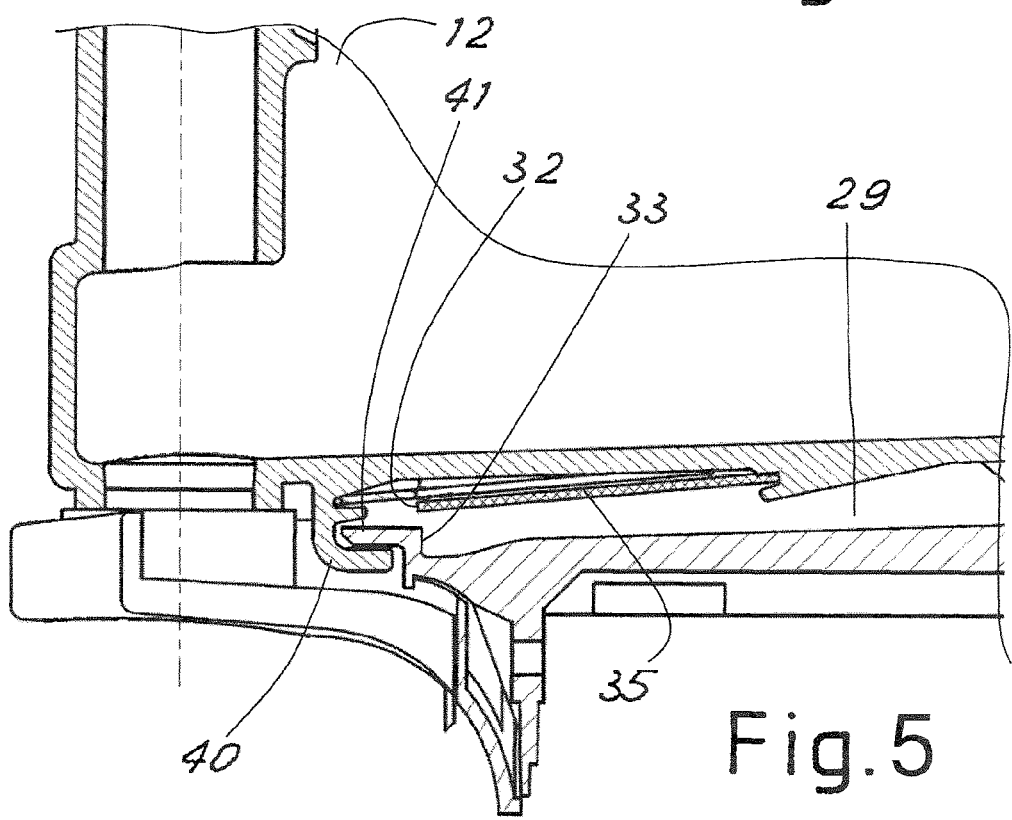

As can be seen more clearly in FIGS. 4 and 5, the snap-engaging means comprise advantageously a snap-engaging device 30 which is mounted on the bottom surface of the tank so as to have a front edge 32 directed towards the front part of the tank. This edge is elastically pushed so as to engage with a corresponding stepped engaging surface 33 which is present along the seat 29, so as to prevent the forwards movement of the tank in the disassembly direction.

As can be clearly seen in FIG. 5, the operating lever 31 allows the snap-engaging device 30 to be moved manually into a position where the edge 32 is disengaged from the corresponding engaging surface 33 in the seat. Advantageously, the disengaging movement is in an upwards direction. Moreover, the operating lever is advantageously seated in a special seat 34 above a side surface of the seat 29 which receives the tank.

In this way there is very little likelihood (for example during external cleaning of the machine) of the lever being accidentally operated, with consequent undesirable disengagement of the tank. Moreover, owing to the advantageously chosen position of the lever, the correct engaged condition can be easily checked since it coincides with the lever resting inside the seat 34.

Various embodiments of the engaging device may be imagined on the basis of the description provided hitherto. Advantageously, the engaging device may comprise a rigid plate 35 which defines the front engaging edge 32 and which at the rear is supported hinged on the tank at 36.

A further resiliently deformable element 37 (made of metal or plastic), which resiliently pushes the plate so as to keep the front edge 32 in the engaged position, may be provided between plate and tank. Alternatively, it is possible to make use of the weight itself of the plate, which falls towards the engaging position, thereby avoiding the presence of resilient pressing parts.

As can again be clearly seen in FIG. 4, the resilient element 37 may be engaged between the plate 35 and a suitable groove or seat 38, which is situated opposite the groove or seat 36 in which the plate 35 is hinged. In this way, the engaging device may be snap-engaged between the two seats 36 and 38 and may be easily removed for cleaning operations once the tank is removed from the machine.

Slidable constraining means 39 are also advantageously provided between tank and seat and act in the vertical direction so as to prevent raising of the tank from the seat when the tank is in its operating position.

These constraining means 39 advantageously comprise a first engaging tooth or element 40 which is present underneath the tank and a complementary second engaging tooth or element 41 present in the seat, these two elements engaging with each other and being slidably superimposed when the tank is pushed into its operating position shown in the figures. In this operating position the two engaging elements have vertically facing surfaces which form constraining means preventing raising of the tank from the seat. By means of a small movement in the tank removal direction (after releasing the snap-engaging means) it is possible to disengage the two engaging elements 40 and 41 and perform easily removal of the tank from the machine.

At this point it is clear how the predefined objects have been achieved. The tank can be easily and rapidly mounted on and removed from the machine. In order to mount the tank, it is sufficient to push it into position over the cooling cylinder 19 until the seal 24 engages and the engaging device 30 is snap-engaged. For removal, it is likewise simply required to operate suitably the operating lever and remove the tank.

With the solution according to the invention it is possible to avoid accidental disengagement, for example following knocks or external cleaning of the machine. Moreover, the system described is inexpensive, robust and can be easily maintained and cleaned.

Obviously, the above description of an embodiment applying the innovative principles of the present invention is provided by way of example of these innovative principles and must therefore not be regarded as limiting the scope of the rights claimed herein. The exact form and proportions of the various parts of the machine may be varied depending on the specific technical (and aesthetic) requirements. The engaging system may also be mounted so as to remain on the base of the machine after removal of the tank. The machine may also comprises any other known device for this type of machine.

The invention claimed is:

1. A machine for producing and dispensing a product including ice cream, iced beverages or granita, comprising a removable product-containing tank having a front end with a tap for dispensing the product and a rear opening, wherein the tank sealingly houses a cooling element with a substantially horizontal axis and a motor-driven mixer element which rotates coaxially with the cooling element so as to keep the product stirred and push the product towards the dispensing tap, the tank being removable from the machine by means of extraction from an operating position in a disassembly direction which is substantially parallel to the substantially horizontal axis of the cooling element, wherein the tank comprises a bottom surface which faces a corresponding seat on a base of the machine and further comprises snap-engaging means for locking movement of the tank in the disassembly direction, the snap-engaging means provided between said seat and the tank and being able to be manually released by means of operation of at least one operating lever, wherein the snap-engaging means comprises a snap-engaging device mounted on the bottom surface of the tank, or which is mounted for remaining on the base of the machine after removal of the tank, and a front edge directed towards the front end of the tank and engageable with a corresponding engaging surface in the seat, the operating lever allowing the snap-engaging device to be moved manually into a position where the front edge is disengaged from the corresponding engaging surface in the seat.

2. The machine according to claim 1, wherein the front edge of the snap-engaging device is resiliently pushed so as to engage with the corresponding engaging surface present in the seat in order to prevent forward movement of the tank in the disassembly direction, the operating lever configured to move the snap-engaging device into a position where the front edge is released from the corresponding engaging surface in the seat.

3. The machine according to claim 2, further comprising a constraining means provided between the tank and the seat and configured to prevent raising of the tank from the seat when the tank is in the operating position.

4. The machine according to claim 3, wherein the constraining means comprise a first engaging element present below the tank and a complementary second engaging element present in the seat, wherein the first and second elements slidably engage when the tank is in the operating position and have vertically facing surfaces which form the constraining means configured to prevent raising of the tank from the seat.

5. The machine according to claim 1, wherein the operating levers are two in number and are designed in the form of tabs projecting symmetrically on opposing sides of the tank in vicinity of the front end of the tank.

6. The machine according to claim 2, wherein the snap-engaging device comprises a rigid plate which defines the front edge and which at a rear is supportably hinged on the tank.

7. The machine according to claim 6, wherein a resilient element is present between the plate and the tank and resiliently pushes the plate with the front edge into an engaged position.

8. The machine according to claim 1, wherein the at least one operating lever is seated in an associated seat in the base and causes release of the snap-engaging means with upward movement of the at least one operating lever.

9. The machine according to claim 1, wherein the rear opening of the tank is sealingly closed around a base of the cooling element by means of a seal present in a vertical wall of the machine from which the cooling element and the mixer element project.

10. The machine according to claim 1, wherein the mixer element is designed in form of a cylindrical spiral screw which is rotatable about the cooling element and which engages, at a front end of the cooling element, on an end of a motor-driven shaft which passes axially through the cooling element.

* * * * *